US009779469B2

United States Patent
Howes et al.

(10) Patent No.: US 9,779,469 B2
(45) Date of Patent: Oct. 3, 2017

(54) REGISTER SPILL MANAGEMENT FOR GENERAL PURPOSE REGISTERS (GPRS)

(71) Applicant: QUALCOMM Incorporated, San Diego, CA (US)

(72) Inventors: Lee Howes, San Diego, CA (US); Maxim Kazakov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 14/828,215

(22) Filed: Aug. 17, 2015

(65) Prior Publication Data

US 2017/0053374 A1 Feb. 23, 2017

(51) Int. Cl.
| | | |
|---|---|---|
| G06T 1/60 | (2006.01) |
| G06F 3/06 | (2006.01) |
| G06F 9/45 | (2006.01) |
| G06T 1/20 | (2006.01) |
| G06F 9/30 | (2006.01) |
| G06F 9/46 | (2006.01) |

(52) U.S. Cl.
CPC .............. *G06T 1/20* (2013.01); *G06F 3/0604* (2013.01); *G06F 3/0647* (2013.01); *G06F 3/0683* (2013.01); *G06F 8/441* (2013.01); *G06F 9/30127* (2013.01); *G06F 9/30138* (2013.01); *G06F 9/462* (2013.01); *G06T 1/60* (2013.01)

(58) Field of Classification Search
CPC . G06T 1/20; G06T 1/60; G06F 3/0604; G06F 3/0647; G06F 3/0683; G06F 8/441; G06F 9/30127; G06F 9/30138; G06F 9/462

USPC ................................. 345/501, 530, 537, 559
See application file for complete search history.

(56) References Cited

U.S. PATENT DOCUMENTS

| | | | |
|---|---|---|---|
| 5,564,031 A | 10/1996 | Amerson et al. | |
| 7,975,134 B2 | 7/2011 | Gonion | |
| 8,310,492 B2 * | 11/2012 | McCrary ............... | G06F 9/3851 345/506 |
| 9,009,692 B2 * | 4/2015 | Kalogeropulos ....... | G06F 8/441 717/152 |
| 2006/0155973 A1 | 7/2006 | Soltis et al. | |
| 2007/0234012 A1 | 10/2007 | Hoflehner et al. | |

(Continued)

FOREIGN PATENT DOCUMENTS

WO    2012123061 A1    9/2012

OTHER PUBLICATIONS

Das, et al., "Issues and Support for Dynamic Register Allocation," Advances in Computer Systems Architecture, Lecture Notes in Computer Science, Sep. 6-8, 2006, vol. 4186, pp. 351-358.

(Continued)

*Primary Examiner* — Jacinta M Crawford
(74) *Attorney, Agent, or Firm* — Shumaker & Sieffert, P.A.

(57) ABSTRACT

Techniques are described for copying data only from a subset of memory locations allocated to a set of instructions to free memory locations for higher priority instructions to execute. Data from a dynamic portion of one or more general purpose registers (GPRs) allocated to the set of instructions may be copied and stored to another memory unit while data from a static portion of the one or more GPRs allocated to the set of instructions may not be copied and stored to another memory unit.

19 Claims, 8 Drawing Sheets

(56) References Cited

U.S. PATENT DOCUMENTS

| | | | |
|---|---|---|---|
| 2010/0199054 A1* | 8/2010 | Kishore | G06F 9/30032 |
| | | | 711/162 |
| 2011/0161945 A1 | 6/2011 | Kalogeropulos et al. | |
| 2011/0219364 A1* | 9/2011 | Makarov | 717/151 |
| 2012/0066472 A1 | 3/2012 | Gonion | |
| 2014/0297994 A1 | 10/2014 | Grochowski et al. | |
| 2015/0193234 A1* | 7/2015 | Udayakumaran | G06F 9/3013 |
| | | | 712/3 |

OTHER PUBLICATIONS

Rakvic, et al., "Performance Advantage of the Register Stack in Intel® Itaniumn™ Processors," Nov. 18, 2002, retrieved on Apr. 16, 2015 from, http://www.usc.edu/dept/ee/scip/assets/001/56457.pdf]l, 11 pp.

Diamos G., et al., "Translating GPU Binaries to Tiered SIMD Architectures with Ocelot", Mar. 13, 2009 (Mar. 13, 2009), 14 Pages, XP055325145, Retrieved from the Internet: URL: https://smartech.gatech.edu/bitstream/handle/1853/27246/git-cercs-09-01.pdf?sequence=1&isAllowed=y, [retrieved on Dec. 1, 2016].

International Search Report and Written Opinion—PCT/US2016/042340—ISA/EPO—dated Dec. 12, 2016 (14 pp).

Response to First Written Opinion from corresponding PCT Application Serial No. PCT/US2016/042340 filed on May 31, 2017 (25 pages).

Second Written Opinion from corresponding PCT Application Serial No. PCT/US2016/042340 dated Jul. 12, 2017 (9 pages).

\* cited by examiner

REGISTER SPILL MANAGEMENT FOR GENERAL PURPOSE REGISTERS (GPRS)

TECHNICAL FIELD

This disclosure relates to data storage, and more particularly, to data storage techniques in general purpose registers (GPRs).

BACKGROUND

Processing units, such as graphics processing units (GPUs), include processing cores having general purpose registers (GPRs) that store data resulting from the execution of an instruction or data needed for the execution of an instruction. For example, a processing element of the processing core may include an arithmetic logic unit (ALU) that performs a plurality of arithmetic operations. The GPR may store the results of the arithmetic operations and/or store operands of the arithmetic operations.

SUMMARY

In general, this disclosure describes techniques for managing register spill when a higher priority set of instructions are to execute on a processing unit during execution of a lower priority set of instructions on the processing unit. The processing unit includes one or more general purpose registers (GPRs) that stores data needed for the execution of lower priority set of instructions. In the techniques described in this disclosure, the one or more GPRs include a static pool of memory locations and a dynamic pool of memory locations.

The processing unit may copy data of the low priority set of instructions stored only in the dynamic pool of memory locations into a memory unit separate from the one or more GPRs, and delete the copied data from the one or more GPRs (e.g., spill only from the dynamic pool of memory locations). In this way, the processing unit may create sufficient storage area for executing the high priority set of instructions without needing to spill all memory locations that stored data for the low priority set of instructions. Spilling only from the dynamic pool of memory locations may allow for fast, low power context switching from the low priority set of instructions to the high priority set of instructions and/or allow for fair scheduling between instructions, where the delayed instructions are higher priority than the instructions that have complete execution to a block point (also referred to as a synchronization point).

In one example, the disclosure describes a method of executing instructions on a graphics processing unit (GPU), the method comprising executing, with one or more processing elements of one or more cores of the GPU, a first set of instructions, determining, with the GPU, that a second set of instructions to be executed on the GPU is given higher priority than the first set of instructions executing on the GPU, copying, with the GPU, data stored in a subset, and not all, of one or more general purpose register (GPRs) that are allocated to the first set of instructions to another memory unit in response to determining that the second set of instructions are given higher priority, the one or more GPRs are accessible by the one or more cores of the GPU on which the first and second sets of instructions execute, and executing, with the one or more processing elements and after the copying, the second set of instructions utilizing the subset of the one or more GPRs.

In one example, the disclosure describes a device for executing instructions, the device comprising one or more general purposes registers (GPRs), and a graphics processing unit (GPU). The GPU configured to execute, with one or more processing elements of one or more cores of the GPU, a first set of instructions, determine that a second set of instructions to be executed on the GPU is given higher priority than the first set of instructions executing on the GPU, copy data stored in a subset, and not all, of the one or more GPRs that are allocated to the first set of instructions to another memory unit in response to determining that the second set of instructions are given higher priority, wherein the one or more GPRs are accessible by the one or more cores of the GPU on which the first and second sets of instructions execute, and execute, with the one or more processing elements and after the copying, the second set of instructions utilizing the subset of the one or more GPRs.

In one example, the disclosure describes a device for executing instructions, the device comprising one or more general purposes registers (GPRs) and a graphics processing unit (GPU). The GPU comprising means for executing a first set of instructions, wherein the GPU comprises one or more cores, and the one or more cores comprise the means for executing, means for determining that a second set of instructions to be executed on the GPU is given higher priority than the first set of instructions executing on the GPU, means for copying data stored in a subset, and not all, of the one or more GPRs that are allocated to the first set of instructions to another memory unit in response to determining that the second set of instructions are given higher priority, wherein the one or more GPRs are accessible by the one or more cores of the GPU on which the first and second sets of instructions execute, and means for executing, after the copying, the second set of instructions utilizing the subset of the one or more GPRs.

In one example, the disclosure describes a computer-readable storage medium having instructions stored thereon that when executed cause one or more processors to execute, with one or more processing elements of one or more cores of a graphics processing unit (GPU), a first set of instructions, determine that a second set of instructions to be executed on the GPU is given higher priority than the first set of instructions executing on the GPU, copy data stored in a subset, and not all, of one or more general purpose register (GPRs) that are allocated to the first set of instructions to another memory unit in response to determining that the second set of instructions are given higher priority, wherein the one or more GPRs are accessible by the one or more cores of the GPU on which the first and second sets of instructions execute, and execute, with the one or more processing elements and after the copying, the second set of instructions utilizing the subset of the one or more GPRs.

The details of one or more examples are set forth in the accompanying drawings and the description below. Other features, objects, and advantages will be apparent from the description, drawings, and claims.

DETAILED DESCRIPTION

Figure 1:
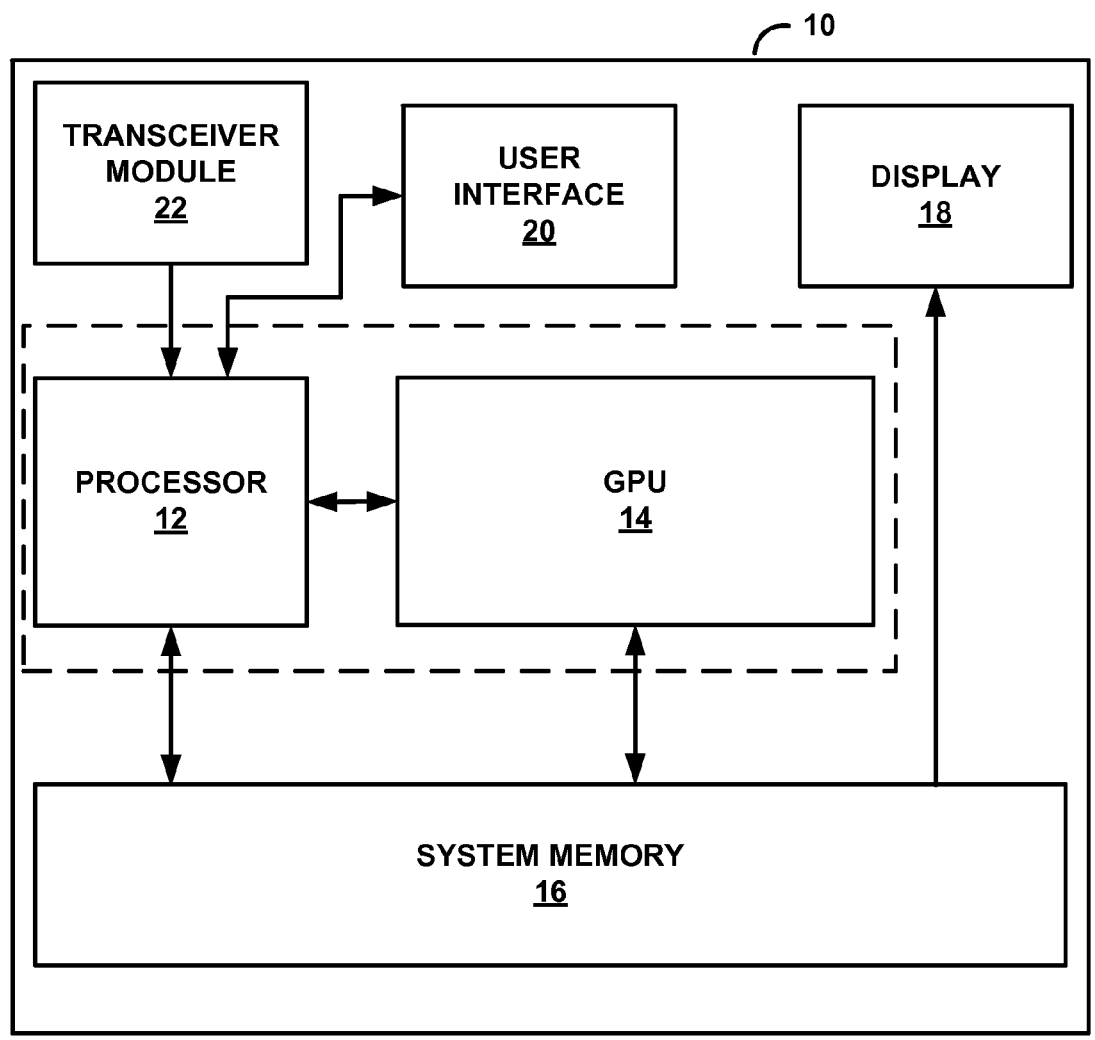
FIG. 1 is a block diagram illustrating an example device for processing data in accordance with one or more example techniques described in this disclosure.

Parallel processing units, such as graphics processing unit (GPUs) that are configured to perform many operations concurrently or in parallel (e.g., at the same time), include one or more processor cores (e.g., shader cores for a GPU) that execute instructions of one or more programs. For ease of description, the techniques described in the disclosure are described with respect to a GPU or a general purpose GPU (GPGPU). However, the techniques described in this disclosure may be extended to parallel processing units that are not necessarily GPUs or GPGPUs, as well as non-parallel processing units (e.g., ones not specifically configured for parallel processing).

The GPU may be designed with a single instruction, multiple data (SIMD) structure. In the SIMD structure, a shader core includes a plurality of SIMD processing elements, where each SIMD processing element executes instructions of the same program, but on different data. A particular instruction executing on a particular SIMD processing element is referred to as a thread. Each SIMD processing element may be considered as executing a different thread because the data for a given thread may be different; however, the thread executing on a processing element is the same instruction, as the instruction executing on the other processing elements. In this way, the SIMD structure allows the GPU to perform many tasks concurrently.

As an example, for vertex processing, the GPU may perform the same tasks for each vertex, but the vertex data for each vertex may be different (e.g., different coordinates, different color values, etc.). The SIMD structure allows the GPU to process many vertices in parallel by executing the same instance of a vertex shader on different SIMD processing elements. In this example, each SIMD processing element may execute a thread of the vertex shader, where each thread is one instance of the vertex shader.

A SIMD processing element includes one or more arithmetic logic units (ALUs), and the SIMD processing element stores the result in one or more general purpose registers (GPRs). A plurality of GPRs is referred to as a general purpose register file (GPRF). The GPRF includes dedicated registers for storing resulting data from one or more SIMD processing elements. The GPRs of the GPRF may be accessible only by the processing core that includes the processing elements, and not by other units of the GPU such as hardware units of a graphics pipeline. In this sense, the GPRs should not be confused with local cache or local memory of the GPU, which is available to all units of the GPU.

In the techniques described in this disclosure, the GPRs of the GPRF may be divided into two portions: a static portion and a dynamic portion. The static portion includes a pool of static memory locations in one set of GPRs that remain allocated to a particular set of instructions throughout the execution of a program that includes that set of instructions. The dynamic portion includes a pool of dynamic memory locations in another set of GPRs. At least one of the dynamic memory locations in this set of GPRs is assigned to a first set of instructions and then assigned to a second set of instructions even if the program that includes the first set of instructions is still executing.

The GPRs that form the static portion of the GPRF are referred to as the static portion of the GPRF (or static GPRs), and the GPRs that form the dynamic portion of the GPRF are referred to as the dynamic portion of the GPRF (or dynamic GPRs). The static portion is "static" because the allocation of the memory locations in the static portion to a set of instructions remains until the GPU completed execution of the program that includes the set of instructions. The allocated memory locations in the static portion cannot be allocated to any other set of instructions until the GPU completes execution of the program that includes the set of instructions. The dynamic portion is "dynamic" because the allocation of the memory locations in the dynamic portion to a set of instruction can change while the GPU completes execution of the program that includes the set of instructions. For instance, a set of instructions of a first program may be allocated to a memory location in the dynamic portion, and while the first program is still executing or paused (i.e., not completed execution), the memory location in the dynamic portion may be allocated to a set of instructions of a second program.

In some cases, during execution of a first set of instructions, the GPU may determine that a second set of instructions to be executed on the GPU are given higher priority than the first set of instructions executing on the GPU (i.e., completion of the execution of the second set of instructions should be prioritized before the completion of the execution of the first set of instructions). However, there may not be sufficient memory locations in the GPRs for the data on which the second set of instructions will operate.

For such cases, the GPU may need to spill data from the GPRs into another memory unit (e.g., output data from the GPRs to cache, local memory or off chip to system memory). The GPU may copy data stored in the subset, but not all, of the memory locations of the GPRs that are allocated to the first set of instructions to another memory unit. For example, the GPU may copy data from the dynamic memory locations in the pool of dynamic memory locations of the GPRs (e.g., the dynamic portion of the GPRF) that are allocated to the first set of instructions, but not from static memory locations in the pool of static memory locations of the GPRs (e.g., not from the static portion of the GPRF) that are allocated to the first set of instructions.

The second set of instructions may then execute on the GPU using the subset of the memory locations of the GPRs that were allocated to the first set of instructions. For example, the GPU may determine that the dynamic memory locations that were allocated to the first set of instructions are now allocated to the second set of instructions.

In this manner, the GPU may spill only a portion of the GPRs (e.g., only some, but not all, of the GPRs) such as a portion large enough for the GPU to execute the higher priority set of instructions. If a dynamic GPRs did not exist, and the GPRF only included a static portion, then all of the memory locations allocated to the first set of instructions would need to be spilled because the allocation of the static portion cannot change during run-time. Spilling all memory locations consumes additional power and takes additional time than spilling only a subset (e.g., just the dynamic memory locations). Accordingly, by spilling only a portion of the memory locations of the GPRF (e.g., some but not all of the GPRs of the GPRF) allocated to the first set of instructions, the techniques described in this disclosure may reduce power consumption and reduce delay before the second set of instructions can execute, as compared to examples where all memory locations allocated to the first set of instructions are spilled.

FIG. 1 is a block diagram illustrating an example device for processing data in accordance with one or more example techniques described in this disclosure. FIG. 1 illustrates device 10, examples of which include, but are not limited to, video devices such as media players, set-top boxes, wireless handsets such as mobile telephones, personal digital assistants (PDAs), desktop computers, laptop computers, gaming consoles, video conferencing units, tablet computing devices, and the like.

In the example of FIG. 1, device 10 includes processor 12, graphics processing unit (GPU) 14, and system memory 16. In some examples, such as examples where device 10 is a mobile device, processor 12 and GPU 14 may be formed as an integrated circuit (IC). For example, the IC may be considered as a processing chip within a chip package, and may be a system-on-chip (SoC). In some examples, processor 12 and GPU 14 may be housed in different integrated circuits (i.e., different chip packages) such as examples where device 10 is a desktop or laptop computer. However, it may be possible that processor 12 and GPU 14 are housed in different integrated circuits in examples where device 10 is a mobile device.

Examples of processor 12 and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks).

For purposes of illustration, the techniques described in this disclosure are described with GPU 14. However, the techniques described in this disclosure are not so limited. The techniques described in this disclosure may be extended to other types of parallel processing units (e.g., processing units that provide massive parallel processing capabilities, even if not for graphics processing). Also, the techniques described in this disclosure may be extended to processing units not specifically configured for parallel processing.

Processor 12 may execute various types of applications. Examples of the applications include web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing.

In some non-graphics related examples, processor 12 may generate data that is better suited to be processed by GPU 14. Such data need not necessarily be for graphics or display purposes. For instance, processor 12 may output data, on which matrix operations need to be performed, to GPU 14, and GPU 14 may in turn perform the matrix operations.

In general, processor 12 may offload processing tasks to GPU 14, such as tasks that require massive parallel operations. As one example, graphics processing requires massive parallel operations, and processor 12 may offload such graphics processing tasks to GPU 14. However, other operations such as matrix operations may also benefit from the parallel processing capabilities of GPU 14. In these examples, processor 12 may leverage the parallel processing capabilities of GPU 14 to cause GPU 14 to perform non-graphics related operations.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

System memory 16 may be the memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 and/or GPU 14 to perform the functions ascribed in this disclosure to processor 12 and GPU 14. Accordingly, system memory 16 may be a computer-readable storage medium having instructions stored thereon that, when executed, cause one or more processors (e.g., processor 12 and GPU 14) to perform various functions.

System memory 16 is a non-transitory storage medium. The term "non-transitory" indicates that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

Device 10 may also include display 18, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 18 may be external to device 10 in examples where device 10 is a desktop computer. As another example, user interface 20 may be part of display 18 in examples where display 18 is a touch-sensitive or presence-sensitive display of a mobile device.

Display 18 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 18. Transceiver module 22 may include circuitry to allow wireless or wired communication between device 10 and another device or a network. Transceiver module 22 may include modulators, demodulators, amplifiers and other such circuitry for wired or wireless communication.

As described above, GPU 14 provides massive parallel processing capabilities. One way in which GPU 14 provides such parallel processing capabilities is via a single instruction, multiple data (SIMD) structure. In the SIMD structure, GPU 14 executes a plurality of instances of the same program (sometimes also referred to as a kernel). For instance, graphics processing, and some non-graphics related processing, require the same operations to be performed, but on different data.

GPU 14 may execute shader programs (referred to simply as shaders) that perform graphics related tasks and execute kernels that perform non-graphics related tasks. GPU 14 includes at least one core (sometimes referred to as a shader core), and the shader programs or kernels execute on the core. For brevity and ease of description, GPU 14 is described as executing instructions of kernels. However, GPU 14 may similarly execute shader programs utilizing the techniques described in this disclosure. GPU 14 may execute multiple instances of a kernel to process multiple data values at one time. In general, the operations that need to be performed on the data may be the same so that the kernel can exploit the massive parallel capabilities of GPU 14.

To execute the multiple instances of a kernel, the core of GPU 14 includes a plurality of processing elements, and each processing element may execute one instance of the kernel. For example, each processing element may execute a first instruction of the kernel. Although the instruction being executed by the processing elements is the same, the values on which the instruction operates in each processing element may be different. In this sense, each processing element may be considered as executing a thread (e.g., an instance) of the kernel, where the thread is an instance of execution of the kernel for a given data. Accordingly, each processing element may execute a different thread because the data for each thread may be different, but the underlying instruction for each thread may be the same.

As a basic example, an instruction of a kernel may define an operation of adding three values. In this example, each of the processing elements may add three values, but the specific values being added by each processing element may be different. Accordingly, each processing element may execute a thread (e.g., instance) of the kernel, where the thread defines an operation of adding three values. Therefore, the instruction may be the same (i.e., add three values), but one or more of the three values for each processing element may be different. By executing the instruction to add three values on each of the processing elements at the same time, GPU 14 may be able to provide parallel computation of adding three values together, in this example.

Each of the processing elements may store the resulting, final value of the operations performed by the processing element in a general purpose register (GPR) of the core. The GPR in the core may be configured to store a plurality of values one of the processing elements. A plurality of GPRs forms a GPR file (GPRF).

In the techniques described in this disclosure, the GPRF includes a static portion (e.g., static GPRs) and a dynamic portion (e.g., dynamic GPRs). For instance, a subset of the GPRs may together form a static portion and another subset of the GPRs may together form a dynamic portion. To ease with understanding, this disclosure describes the GPRF as including a pool of static memory locations and a pool of dynamic memory locations. The pool of static memory locations may refer to a grouping of GPRs that form the static portion, and the pool of dynamic memory locations may refer to a grouping of GPRs that form the dynamic memory locations.

In some situations, the term "GPR" has been used to indicate a memory unit having a plurality of memory locations. For example, a GPR has been defined as a set of storage locations for storing temporary data from one or more SIMD processing elements. In such examples, the GPR includes a static portion and a dynamic portion, much like how the GPRF includes static GPRs and dynamic GPRs.

This disclosure is described in context of a GPRF having static memory locations of a static portion (e.g., having a subset of static GPRs) and having dynamic memory locations of a dynamic portion (e.g., having a subset of dynamic GPRs). However, the examples should not be considered limited as such and are extendable also to the case where one GPR includes a plurality of memory locations, where a subset of the memory locations is static memory locations of a static portion and another subset of the memory locations is dynamic memory locations of a dynamic portion. To ease with understanding, this disclosure describes memory locations of one or more GPRs, where one subset of memory locations is for the static portion and one subset of memory locations is for the dynamic portion. In the example of the GPRF, the subset of memory locations of the static portion may be a plurality of static GPRs and the subset of memory locations of the dynamic portion may be a plurality of dynamic GPRs. In the example of a single GPR, the static portion may be a subset of memory locations in the GPR (e.g., the static memory locations) and the dynamic portion may be another subset of memory locations in the GPR (e.g., the dynamic memory locations).

In any event, the dynamic memory locations may be considered dynamic in the sense that processor 12 assigns the memory locations in the dynamic portion of the one or GPRs of the GPRF (e.g., dynamic GPRs) during execution of a program executing on GPU 14. The static memory locations may be considered static in the sense that processor 12 assigns the memory locations in the static portion of the one or more GPRs of the GPRF (e.g., static GPRs) prior to execution of a program that is to execute on GPU 14.

GPU 14 may execute a plurality of threads of a kernel in parallel. A set of threads may be referred to as a wavefront. For example, the threads in a wavefront may be the same instructions, but may operate on different data. The data on which the wavefront operates (e.g., operands of the instructions that form the wavefront) and the results of the execution of the wavefront (e.g., the result of the execution of the instructions) may be stored in the dynamic memory location and the static memory location of the one or more GPRs of the GPRF or just the dynamic memory location.

In some examples, during execution of a kernel, GPU 14 may determine that another kernel is to execute. The switching of execution of one kernel to another is referred to as context switching. However, there may not be sufficient space available in the GPRF to store the data on which the other kernel is to operate or the result of the execution of the other kernel. To free space in the GPRF, GPU 14 performs a spill operation. Processor 12 may instruct GPU 14 to perform the spill operation, or GPU 14 may determine, without instructions from processor 12, to perform the spill operation.

The spill operation includes copying data out of the GPRs and into another memory unit (e.g., cache or local memory of GPU 14 or system memory 16). Then there is enough memory locations in the GPRs for the execution of the other kernel. In general, because access by the processing elements to the GPRs requires less power and time than other memory units (e.g., cache or local memory of GPU 14 or system memory 16), storing data in and retrieving data from the GPRs is preferable.

After GPU 14 (e.g., a controller within the core of GPU 14 or a processing element of GPU 14) performs the spill operation, the GPRs from which the data was copied and stored become free for the instructions of the kernel. In this way, GPU 14 may pause the execution of a lower priority kernel and allow the higher priority kernel to execute. Then after the higher priority kernel has completed execution, GPU 14 can retrieve all of the data and possibly state information of the lower priority kernel and complete the execution of the lower priority kernel.

In some techniques, the spill operation included spilling of all memory locations that are allocated to each of the wavefronts of the lower priority kernel. This is because, in some techniques, there exists only static memory locations (e.g., the GPRF includes only static GPRs), and because static memory locations have to remain allocated to a particular wavefront until completion of the kernel, all memory locations had to be spilled to free space for the other kernel.

However, according to the techniques described in this disclosure, GPRs may include dynamic memory locations and static memory locations, and dynamic memory locations do not have to remain allocated to respective wavefronts throughout the execution of the wavefront. GPU 14 may not need to spill all of the memory locations allocated to a wavefront of a kernel. Rather, GPU 14 may spill only a subset of the memory locations. For instance, GPU 14 may spill data from the dynamic GPRs (e.g., dynamic memory locations of the one or more GPRs), but not from the static GPRs (e.g., static memory locations of the one or more GPRs), for the wavefronts allocated to a kernel, and in some examples, only the amount of data needed to allow instructions of the higher priority kernel to execute.

This way, less data needs to be copied from the GPRs of the GPRF to perform the spill operation. In general, transferring data as part of the spill operation may require more power because access to additional memory is needed. Also, the more data that needs to be transferred the more time is consumed (especially if off-chip memory like system memory 16 needs to be accessed) which delays the execution of the high priority kernel. With the techniques described in this disclosure, the higher priority kernel may execute with minimal delay and the additional power consumption may be limited as well.

System memory 16 being off-chip means that GPU 14 needs to output data to or retrieve data from system memory 16 via a bus interconnect that connects various components together. Transferring data via the bus interconnect tends to require more power than transferring data without use of the bus. Also, because the bus interconnect connects various components together, scheduling of commands may be required. However, system memory 16 does not have to require bus interconnect to transfer data. In some cases, system memory 16 may be memory shared by many components and provides more memory space than is available on the chip itself.

Although the above techniques are described with respect to higher priority kernels and lower priority kernels, the techniques described in this disclosure may generally be applicable to spilling of data for one set of instructions to allow execution of another set of instructions, where the sets of instructions may be from different kernels or the same kernel. For instance, in some examples, GPU 14 may implement "fair scheduling." In some cases, each of the threads or wavefronts should complete execution together. However, this is not always the case. For instance, although the instructions are the same, because the data is different for each thread, the execution time of each thread may be different. An example case is branching instructions (e.g., if/then/else instructions), in which one thread or wavefront takes a branch that requires less processing time, but another thread or wavefront takes a branch that requires more processing time.

To ensure that delayed threads catch up to threads that have completed, GPU 14 or processor 12 may define some block points (also referred to as synchronization points) in the threads where all threads pause at the block points to allow all other threads in the synchronizing group to catch up. In some examples, to allow the delayed threads to catch up, GPU 14 may perform the spill operation on some threads that have reached the block to free additional memory space allowing the delayed threads to catch up more quickly because the delayed threads have access to more memory locations. In the techniques described in this disclosure, GPU 14 may spill data from the dynamic memory locations of the threads, but not from the static memory locations, at the block to give more memory locations to the delayed threads. Again, this is because dynamic memory locations (e.g., dynamic GPRs) can be reallocated during runtime, whereas the allocation of the static memory locations (e.g., static GPRs) is fixed.

Because the techniques described in this disclosure are applicable to examples where one kernel is given higher priority than another kernel (e.g., for context switching) or where one set of instructions is given higher priority over another set of instructions (e.g., for fair scheduling), the techniques are generally described as GPU 14 determining that one set of instructions is to be executed by GPU 14 is given higher priority than another set of instructions. GPU 14 may determine that the set of instructions is given higher priority based on information that GPU 14 receives from processor 12 (e.g., in the case where GPU 14 is instructed to execute a higher priority kernel) or based on information that GPU 14 determines (e.g., in the case where GPU 14 determines that a delayed set of instructions is to execute for fair scheduling).

As one example, processor 12 may determine that execution of one kernel is to preempt the execution of another kernel, and therefore, instructs GPU 14 that the other kernel is of higher priority than the current kernel being executed. For example, GPU 14 may execute a kernel to perform certain operations when processor 12 determines that the user interfaced with the graphical user interface (GUI) and caused a change in the icons presented in the GUI. In this case, processor 12 may instruct GPU 14 to stop executing the current kernel and give priority to the kernel for updating the GUI. With the dynamic GPRs described in this disclosure, GPU 14 may be able to free space for the execution of the GUI kernel faster than other techniques without the dynamic GPRs, which may enhance user experience.

In this manner, one or more processing elements of one or more cores of GPU 14 may execute a first set of instructions. GPU 14 may determine that a second set of instructions to be executed on the GPU is given higher priority than the first set of instructions executing on the GPU (e.g., context switching or fair scheduling). GPU 14 may copy data stored in a subset, and not all, of memory locations (e.g., dynamic memory locations, but not static memory locations) of one or more general purpose register (GPRs) that are allocated to the first set of instructions to another memory unit in response to determining that the second set of instructions are given higher priority. In other words, GPU 14 may copy data stored in the dynamic GPRs of the GPRF, and not the static GPRs of the GPRF, that are allocated to the first set of instructions to another memory unit in response to determining that the second set of instructions are given higher priority. The one or more GPRs comprise one or more registers that are accessible only by the one or more cores of GPU 14 on which the first and second sets of instructions execute. The one or more processing elements may execute, after the copying, the second set of instructions utilizing the subset of the memory locations (e.g., one or more of the dynamic memory locations) of the one or more GPRs (e.g., dynamic GPRs) that were allocated to the first set of instructions.

Figure 2:
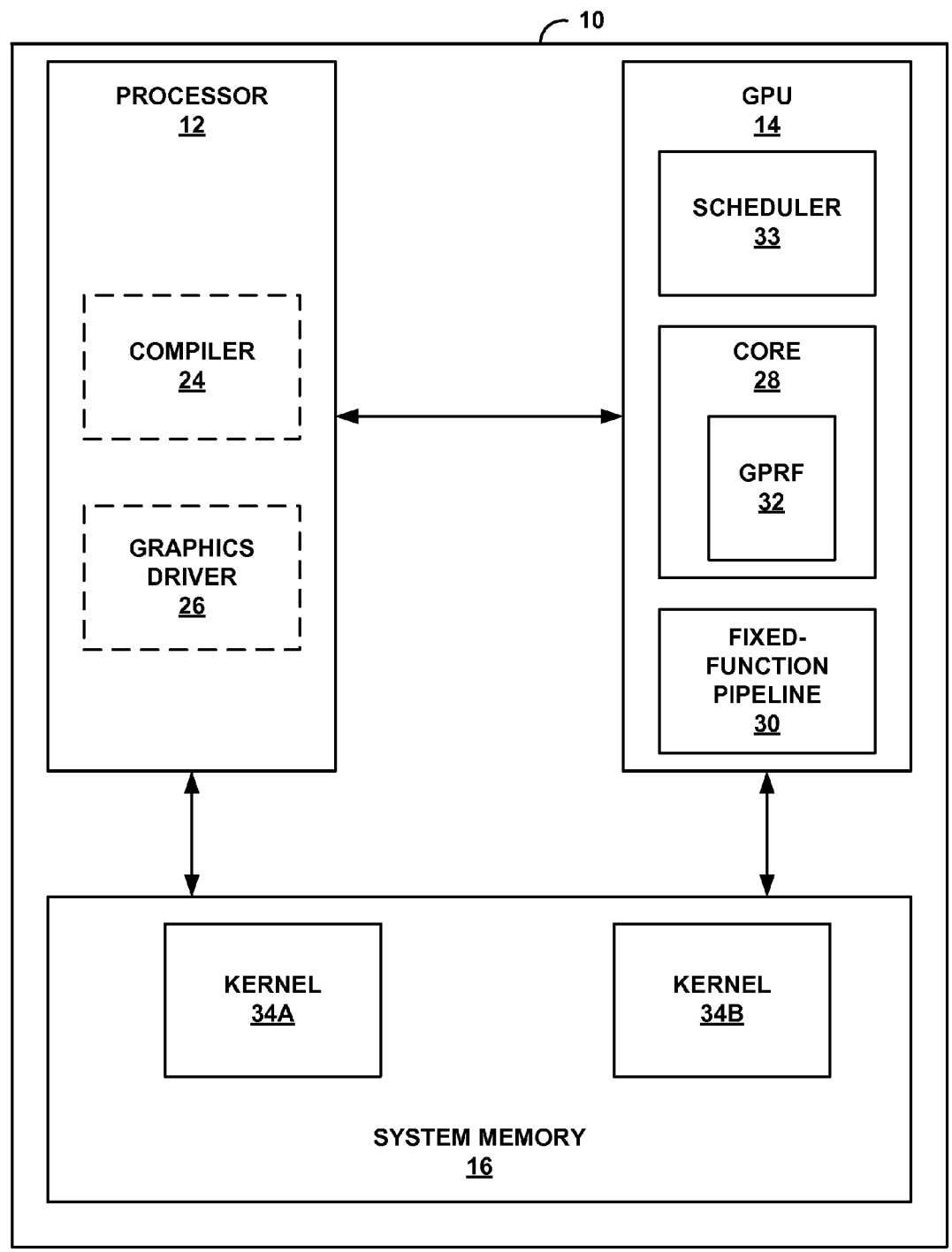
FIG. 2 is a block diagram illustrating components of the device illustrated in FIG. 1 in greater detail.

FIG. 2 is a block diagram illustrating components of the device illustrated in FIG. 1 in greater detail. As illustrated in FIG. 2, GPU 14 includes core 28, which includes GPRF 32 (which includes one or more GPRs), and fixed-function pipeline 30. Core 28 and fixed-function pipeline 30 may together form a processing pipeline used to perform graphics or non-graphics related functions. The processing pipeline performs functions as defined by software or firmware executing on GPU 14 and performs functions by fixed-function units that are hardwired to perform specific functions.

As described above, the software or firmware executing on GPU 14 may be referred to as shader programs or kernels, and the shader programs or kernels may execute on core 28 of GPU 14. Only for ease of description, the techniques are described with respect to kernels, but are equally applicable to shader programs as well. Although only one core 28 is illustrated, in some examples, GPU 14 may include one or more shader cores similar to core 28. Fixed-function pipeline 30 includes the fixed-function units. Core 28 and fixed-function pipeline 30 may transmit and receive data from one another. For instance, the processing pipeline may include kernels executing on core 28 that receive data from a fixed-function unit of fixed-function pipeline 30 and output processed data to another fixed-function unit of fixed-function pipeline 30.

Shader programs and kernels provide users with functional flexibility because a user can design the shader program or kernel to perform desired tasks in any conceivable manner. The fixed-function units, however, are hardwired for the manner in which the fixed-function units perform tasks. Accordingly, the fixed-function units may not provide much functional flexibility.

In the example illustrated in FIG. 2, processor 12 is shown as executing compiler 24 and graphics driver 26. Graphics driver 26 executing on processor 12 may be configured to implement an application programming interface (API) (e.g., OpenGL or OpenCL or a combination of both). In such examples, the shader programs or kernels may be configured in accordance with the same API as graphics driver 26 (e.g., kernels in accordance with OpenCL and shader programs in accordance with OpenGL). Although not illustrated, system memory 16 may store the code for graphics driver 26 that processor 12 retrieves from system memory 16 for execution. Graphics driver 26 is illustrated in a dashed box to indicate that graphics driver 26 is software, executing on hardware (e.g., processor 12), in this example. However, some or all of the functionality of graphics driver 26 may be implemented as hardware on processor 12.

Also, graphics driver 26 may be configured to perform the communication between processor 12 and GPU 14. Accordingly, in this disclosure, when processor 12 is described as instructing or otherwise communicating with GPU 14, processor 12 is performing such functions via graphics driver 26. For example, graphics driver 26 may be configured to allow processor 12 and GPU 14 to communicate with one another. For instance, when processor 12 offloads graphics or non-graphics processing tasks to GPU 14, processor 12 offloads such processing tasks to GPU 14 via graphics driver 26.

In some examples, system memory 16 may store the source code for one or more kernels (e.g., store the source code for kernels 34A and 34B, as an example illustrated in FIG. 2). Processor 12 may retrieve the source code for kernels 34A and 34B, and compiler 24, executing on processor 12, may compile the source code to object code for executing on core 28 of GPU 14. Compiler 24 may compile the source code of kernels 34A and 34B at the time processor 12 determines that kernels 34A and 34B are to be executed, but in some examples, compiler 24 may potentially pre-compile the source code and store the resulting object code in system memory 16.

Similar to graphics driver 26, although not illustrated, system memory 16 may store the code for compiler 24 that processor 12 retrieves from system memory 16 for execution. Compiler 24 is illustrated in a dashed box to indicate that compiler 24 is software, executing on hardware (e.g., processor 12), in this example. However, some functionality of compiler 24 may be implemented as hardware on processor 12, in some examples.

In the techniques described in this disclosure, core 28 may be configured to execute many instances of the same instruction of the same set of instructions in parallel. For example, graphics driver 26 may instruct GPU 14 to retrieve a plurality of values, and instruct GPU 14 to execute kernel 34A or 34B to process the values. In this example, core 28 may execute multiple instances of kernel 34A or 34B, and do so by executing one instance of kernel 34A or 34B on one processing element of core 28 for each of the values.

Each processing element of core 28 may execute the same instruction of kernel 34A or 34B at the same instance; however, the particular values may be different because each processing element is processing a different value. As described above, each processing element may be considered as executing a thread, where a thread refers to one instruction of kernel 34A or 34B that is processing a particular value (e.g., one execution instance of a kernel). In this manner, core 28 may support tens of independent threads (referred to as wavefronts or warps) that can be executed in parallel using multiple processing elements.

Each of the wavefronts maintains its data in a larger one or more GPRs of GPRF 32 that is located on GPU 14, such as in core 28. In this disclosure, one or more GPRs of GPRF 32 may be considered as the memory locations in which data is stored. In some cases, however, one GPR may include a plurality of memory locations, and the techniques described in this disclosure are applicable to such cases as well. In this sense, in this disclosure, description of a GPRF having a plurality of GPRs maps to one GPR having a plurality of storage locations. The disclosure described dynamic memory locations and static memory locations, which may be dynamic GPRs and static GPRs of GPRF 32, respectively, or dynamic storage locations and static storage locations of a GPR.

Compiler 24 may be configured to compile kernel 34A and 34B (e.g., GPU program) and may attempt to minimize the number of registers (e.g., memory locations) needed. For instance, compiler 24 may attempt to minimize of number of GPRs of GPRF 32 that are needed. The number of memory locations needed may be referred to as the register footprint (RFP). To minimize the RFP, compiler 24 may compile kernel 34A and 34B so that during execution kernel 34A and 34B reuse the GPRs of GPRF 32 for different purposes throughout the lifetime of kernel 34A and 34B.

However, as described above, compiler 24 may not be able to allocate sufficient GPRs of GPRF 32 to the wavefronts (i.e., at the time of execution there may not be sufficient GPRs of GPRF 32 that are available), and may determine that spilling of memory locations may be needed to free sufficient memory locations. The spilling of memory locations (e.g., spilling GPRs of GPRF 32) tends to decrease performance because clock cycles are wasted for the spilling operation, rather than execution.

One of the reasons for why spilling is needed is that compiler 24 may divide the GPRs of GPRF 32 into equal portions among wavefronts of kernel 34A and 34B based on the required register footprint for the wavefronts of kernel 34A and 34B (e.g., each wavefront is given the same number of GPRs of GPRF 32). Compiler 24 may divide the one or more GPRs of GPRF 32 into equal portions in a static fashion, meaning that the subdivision is static for the lifetime of a particular kernel execution. The memory locations allocated to a wavefront of a kernel remain allocated to that wavefront throughout lifetime of kernel (i.e., until the kernel has completed fully executing).

Scheduler 33 of GPU 14, which may be hardware on GPU 14 or software or firmware executing on GPU 14, may provide the addresses for the memory locations using the following formula: REG_ADDRESS=ISA_REG_ID+ WAVEFRONT_ID*RFP. In this example, compiler 24 may determines the RFP and the wavefront identification, and the ISA_REG_ID is the identification for the first memory location specified as part of the issued instruction. Based on determined register address (e.g., memory location address), processing elements of core 28 store data for wavefronts in one or more GPRs of GPRF 32.

There may be certain limitations in such an architecture where only static memory locations are used. For example, GPU 14 may be limited in its ability to execute multiple kernels at the same time. The footprint for kernel 34A and 34B might be different, and executing kernel 34A and 34B at the same time with different footprints might be cumbersome. Even if enough memory locations are available, GPU 14 might not be able to use them due to fragmentation.

For instance, the addresses for the memory locations may be serial, and if there is fragmentation, then there may be a gap in addressing. This results in concurrent execution of multiple kernels impractical due to management complexity and results in significant ramp-down/ramp-up overhead. Ramp-down/ramp-up includes the spill operation and also commands to stop execution of a kernel or execution of another kernel.

The maximum number of concurrent wavefronts of the same kernel or of different kernels is based on their register footprints. If a larger footprint is required, then core 28 may execute fewer wavefronts. If GPU 14 executes fewer wavefronts, then latency hiding becomes complicated. For example, if GPU 14 executes fewer wavefronts, then the amount of time it takes to complete execution of kernel 34A or 34B increases and hiding such latency is complicated. Also, reducing the number of wavefronts that GPU 14 executes means that the processing elements of core 28 are not fully utilized. There are idle processing elements of core 28 that are not performing any functions.

Also, allocating more memory locations than needed by a wavefront may be undesirable as well. In general, the number of memory locations (e.g., active registers) needed changes dynamically during execution. For instance, more memory locations may be needed if a wavefront enters a more complex subroutine and decreases on exit from those subroutines. For example, if there is an if/then/else instruction in instructions of a wavefront, one of the instructions may go through the if-condition and another may go through the else-condition. The if-condition may require fewer memory locations, and the else-condition may require more memory locations, but whether the if-condition or else-condition is met is not known until execution (i.e., known dynamically). However, compiler 24 may allocate memory locations based on the worst-case scenario (e.g., assuming that the else-condition is always satisfied). If the worst-case scenario occurs rarely, then there may be many allocated memory locations that are not used or used rarely. Reserving such memory locations that are not used or rarely used is wasteful.

To avoid over reserving (e.g., allocating) memory locations, some type of processing elements such as processor 12 include smaller register files and smaller number of concurrent threads with smaller sized wavefronts (e.g., narrow vector width for the threads). For spilling, processor 12 spill in and out of memory using large hierarchical caches. However, for GPU 14 spilling in and out of memory using large hierarchical caches may be not practical. This is because GPU 14 is configured for high parallel execution resulting in big GPRF 32, and constant spilling negatively impacts this purpose, whereas processor 12 is not used for parallel execution, which allows processor 12 to have a smaller GPRF for its operations, and so spilling is less problematic.

Also, GPU 14 may perform interleaved concurrent execution. For interleaved concurrent execution, having a high GPR capacity (e.g., GPRF 32 includes many GPRs) to interleave multiple threads as well as to execute in parallel. Accordingly, because GPU 14 tend to have high capacity GPRF 32, spilling of all GPRs within GPRF 32 may have a negative impact as a relatively large amount of data may need to written and read back.

In the techniques described in this disclosure, one or more GPRs of GPRF 32 may not include only static memory locations, but dynamic memory locations as well. For example, GPRF 32 may be include two portions: static and dynamic. The static portion includes static memory locations (e.g., static GPRs or static memory locations of a single GPR), and the dynamic portion includes dynamic memory locations (e.g., dynamic GPRs or dynamic memory locations of a single GPR). Compiler 24 may allocate the static memory locations to the wavefronts and that allocation is reserved throughout the execution of the kernel that includes the wavefronts. Compiler 24 may allocate the dynamic memory locations to the wavefronts and that allocation may change throughout the execution of the kernel that includes the wavefronts. In some examples, compiler 24 may allocate static memory location such that the static memory locations are split equally among all wavefronts. Compiler 24 may dynamically allocate (e.g., assign) dynamic memory locations for use by any wavefronts that need additional memory locations.

Accordingly, a set of static memory locations includes memory locations GPRF 32 that are only allocated to one set of instructions throughout the execution of the set of instructions. Also, at least one of the dynamic memory locations includes a memory location that is allocated to a set of instructions and then allocated to one or more other sets of instructions during the execution of the set of instructions.

The following are examples of instructions for memory location assignment (e.g., allocation). For the footprint of the static memory locations (static footprint SFP), the footprint can be a power of 2 to simplify computation, but being a power of 2 is not a requirement. The instruction may be a REG_ADDRESS=ISA_REG_ID<SFP?SFP*WAVE-FRONT_ID+ISA_REG_ID: DYNAMIC_BASE+ISA_REG_ID-SFP. The following is the example for dynamic memory locations, in which the instructions to reserve (blocking call) the specified number of memory locations from the dynamic portion are issued and then released later. For example, DYN_REG_ALLOC dst=OFFSET_IN_DYNAMIC_PORTION, src=REQUESTED_REG_CNT; DYN_REG_FREE src1=OFFSET_IN_DYNAMIC_PORTION, src2=REG_CNT_TO_BE_FREED. Compiler 24 or scheduler 33 may manage the addressing using simple bump-allocation scheme (e.g., incremental allocation until full, then wait until it is empty before issuing new work).

Dynamic allocation of memory locations may be beneficial for various reasons. For instance, dynamic allocation may reduce ramp-down/ramp-up penalty. Compiler 24 may be able to maximize register file utilization at all time (e.g., maximize GPR usage of GPRF 32). Because the memory locations are fully utilized, it may be possible to reduce the size of GPRF 32, for area savings, while keeping the same performance. Core 28 of GPU 14 can execute multiple kernels concurrently, and increase resource utilization by running multiple small kernels concurrently.

The techniques may ensure minimum concurrency regardless of the complexity of the kernel to enable latency hiding while the number of active memory locations is small. In other words, even if the number of static memory locations is few, there can still be a minimum number of kernels that can execute in parallel by using the dynamic memory locations.

Furthermore, for kernels that have wavefronts with variable footprints throughout lifetimes, the dynamic allocation may improve execution performance. For example, in cases with only static memory locations, compiler 24 allocates the static memory locations based on the worst-case scenario (i.e., maximum RFP for all subroutines that might be called) resulting in smallest number of concurrent wavefronts that can execute even if the worst-case scenario does not occur. With the techniques described in this disclosure, core 28 may execute more wavefronts concurrently because dynamic memory locations can be assigned during execution. If, however, the subroutine that requires the most memory locations is always executed, then the benefits may be limited. In general, the chances of the worst-case scenario (i.e., the case where the maximum memory locations is needed) as always happening is low, and therefore, benefits may generally be available.

In the techniques described in this disclosure, GPU 14 may exploit the dynamic allocation of memory locations in GPRF 32 to allow for different wavefronts to execute at different times while minimizing spill. For example, one or more processing elements of one or more cores 28 of GPU 14 may execute a first set of instructions (e.g., instructions of a first wavefront). GPU 14 (e.g., via scheduler 33 or some other controller of GPU 14) may determine that a second set of instructions to be executed on GPU 14 is given higher priority than the first set of instructions executing on GPU 14. The term "higher priority" is used to mean that the resources should be made available to execute the higher priority set of instructions even if that negatively impacts the execution of the lower priority set of instructions.

For instance, in this example, because the second set of instructions are given higher priority, GPU 14 (e.g., controller in core 28) may copy data stored in a subset, and not all, of memory locations of one or more GPRs of GPRF 32 that are allocated to the first set of instructions to another memory unit (e.g., system memory 16 or local memory or cache of GPU 14) in response to determining that the second set of instructions are given higher priority. As an example, GPU 14 may copy data stored in the dynamic GPR and not from the static GPR of the GPRs of GPRF 32. The one or more GPRs of GPRF 32 include memory locations that are accessible only by one or more cores 28 of GPU 14 on which the first and second set of instructions execute. The processing elements of one or more cores 28 may execute, after the copying, the second set of instructions utilizing the subset of the memory locations of the one or more GPRs of GPRF 32 that were allocated to the first set of instructions.

In some examples, the first set of instructions (e.g., first wavefront) and the second set of instructions (e.g., second wavefront) may be instructions for different applications (e.g., kernels). In such examples, to determine that the second set of instructions are given higher priority, GPU 14 may receive a command instructing GPU 14 to execute the second set of instructions in place of the first set of instructions, and determine that the second set of instructions are given higher priority in response to receiving the command.

In some examples, the first set of instructions and the second set of instructions are instructions for the same application, and possibly instructions of the same wavefront. In such examples, to determine that second set of instructions are given higher priority, GPU 14 may determine that a plurality of instructions of the first set of instructions have completed execution to a block point (e.g., a point where all threads wait to allow delayed threads to catch up). GPU 14 may determine that a plurality of instructions of the second set of instructions should be executed before remaining instructions of the first set of instructions are executed in response to determining that the plurality of instructions of the first set of instructions has completed execution to block point.

In general, GPU 14 may receive information allocating a set of memory locations from a pool of static memory location in the one or more GPRs of GPRF 32 (e.g., static GPRs) for the first set of instructions prior to determining that the second set of instructions to be executed on the GPU are given higher priority. For instance, compiler 24 in conjunction with scheduler 33 may determine the static memory locations that are allocated to the wavefronts before execution. GPU 14, via scheduler 33, may determine a set of dynamic memory locations from a pool of dynamic memory locations in the one or more GPRs of GPRF 32 (e.g., dynamic GPRs) for the first set of instructions prior to determining that the second set of instructions to be executed on GPU 14 are given higher priority. In this way, compiler 24 and scheduler 33 may together allocate some static memory locations and some dynamic memory locations to the first set of instructions.

To copy data stored in the subset, and not all, of the memory locations allocated to the first set of instructions, GPU 14 may copy data stored in one or more of the dynamic memory locations in GPRF 32 (e.g., dynamic memory locations of the one or more GPRs, which can be considered as dynamic GPRs) that are allocated to the first set of instructions to the other memory unit. GPU 14 may avoid copying of data stored in any of the static memory locations in the one or more GPRs of GPRF 32 that are allocated to the first set of instructions to any other memory unit (e.g., static memory locations of the one or more GPRs, which can be considered as static GPRs).

Also, compiler 24 and scheduler 33 may allocate the one or more dynamic memory locations in the one or more GPRs of GPRF 32 that were allocated to the first set of instructions to the second set of instructions. In this example, GPU 14 may execute the second set of instructions utilizing the one or more dynamic memory locations in the one or more GPRs of GPRF 32 allocated to the second set of instructions. For example, to determine the set of dynamic memory locations for the first set of instructions, scheduler 33 of GPU 14 may receive, from compiler 24, a request for memory locations in one or more GPRs of GPRF 32 during execution of the first set of instructions. In response, scheduler 33 may determine the set of dynamic memory locations (e.g., determine the addresses of the dynamic memory locations using the pseudo-code described above for DYN_REG_ALLOC).

Figure 3:
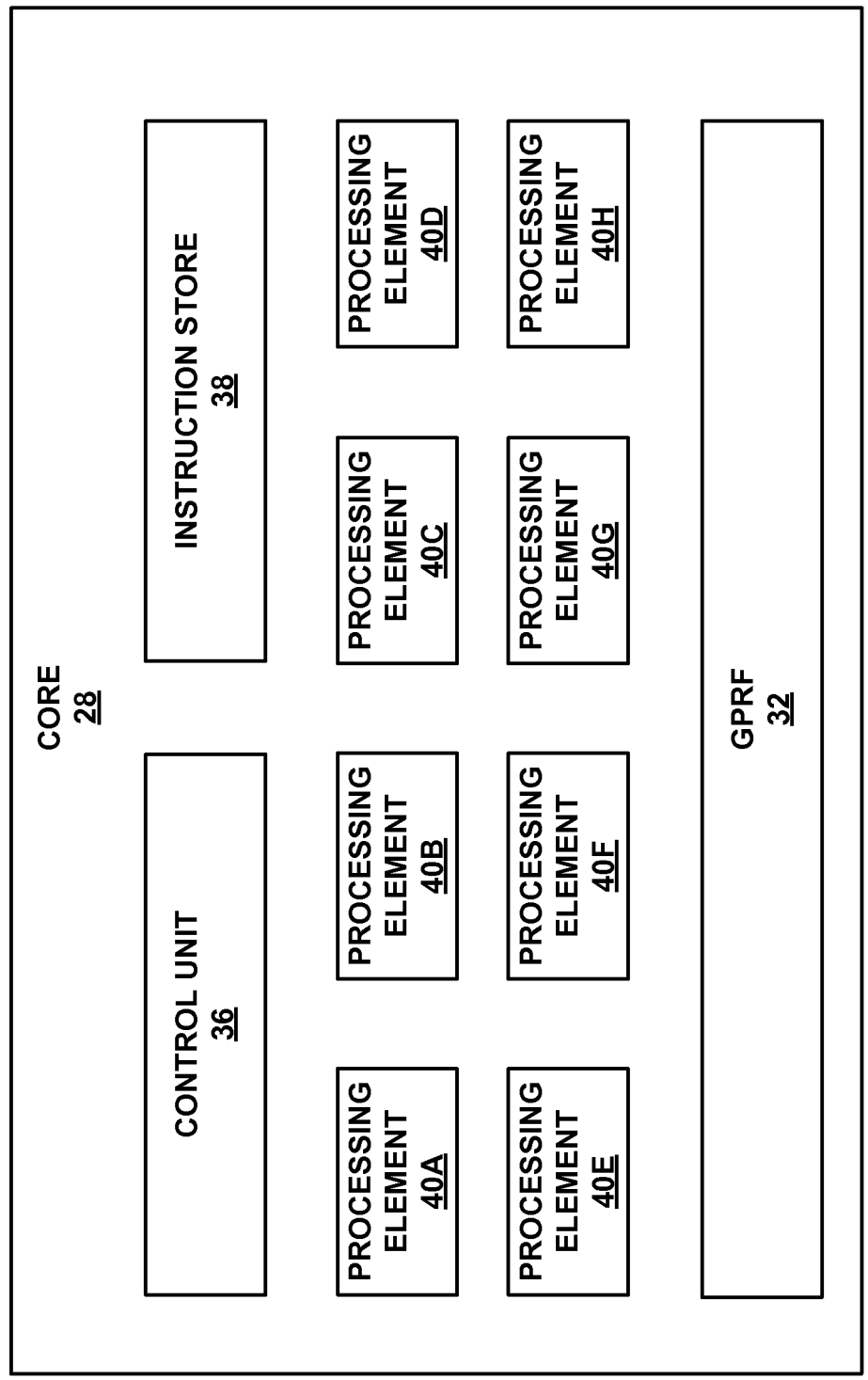
FIG. 3 is a block diagram illustrating one example of a shader core of a graphics processing unit (GPU) of FIG. 2 in greater detail.

FIG. 3 is a block diagram illustrating one example of a core of a GPU of FIG. 2 in greater detail. For instance, FIG. 3 illustrates one example of core 28 of GPU 14. Core 28 includes control unit 36, instruction store 38, one or more processing elements 40A-40H (collectively referred to as "processing elements 40"), and one or more general purpose register file (GPRF) 32. The memory locations of GPRF 32 (e.g., one or more GPRs, in this example) may store data, and hence, may also be referred to as a data store. Although FIG. 3 illustrates eight processing elements 40, there may be more or fewer than eight processing elements 40 in other examples. Processing elements 40 are examples of processing elements on which instances of a kernel (e.g., kernel 34A or 34B) execute in parallel.

Control unit 36 may control the functionality of core 28. For example, control unit 36 may retrieve the instructions that are to be executed by processing elements 40 and store the instructions in instruction store 38. Also, control unit 36 may retrieve the values (e.g., data) that processing elements 40 are to process and store the values in one or more GPRs of GPRF 32.

Also, control unit 36 may be configured to perform the spill operation. For instance, control unit 36 may retrieve data stored in memory locations of one or more GPRs of GPRF 32 and store the data in another memory unit. Moreover, control unit 36 may receive instructions indicating higher priority of a kernel for context switching (i.e., where instructions of one kernel are to be given higher priority than instructions of another kernel). Control unit 36 may also be configured to determine when one instructions of a wavefront are delayed relative to other instructions of the wavefront, and assign higher priority to the delayed instructions of the wavefront for fair scheduling (e.g., determine when a plurality of instruction of a first set of instructions as reached a block point and assign higher priority to the other instructions to allow the other instructions to complete execution up to the block point).

Instruction store 38 may be any type of memory capable of storing instructions such as, but not limited to, volatile memory, non-volatile memory, a cache, random access memory (RAM), static RAM (SRAM), dynamic RAM (DRAM), etc. Control unit 36 may be hardwired circuitry of core 28 that controls the components of core 28. However, it may be possible for control unit 36 to be software or firmware, executing on hardware, of core 28.

Processing elements 40 are configured to execute threads of a program (e.g., one of kernel 34A and 34B or execute both concurrently). Each of processing elements 40 may execute a different thread. For example, each of processing elements 40 may execute an instance of an instruction of a program (e.g., kernel) with respect to potentially different values. Processing elements 40 may be single-instruction, multiple-data (SIMD) processing elements. SIMD processing elements refer to processing elements that, when activated, are configured to execute the same instruction at the same time with respect to different data. This may allow processing elements 40 to execute a plurality of threads (e.g., wavefront) of a program in parallel with respect to different values. In some cases, each of processing elements 40 may execute instructions of a program based on a common program counter that points to an instruction contained in instruction store 38.

If one or more of processing elements 40 are deactivated by control unit 36, then such processing elements 40 do not execute a program instruction for a given instruction cycle. In some cases, control unit 36 may deactivate one or more of processing elements 40 to implement conditional branch instructions where the branching condition is satisfied for some threads and not satisfied for other threads.

In some examples, each of processing elements 40 may include and/or correspond to one or more arithmetic logic units (ALUs). In further examples, each of processing elements 40 may implement ALU functionality. ALU functionality may include addition, subtraction, multiplication, etc.

In accordance with the techniques described in this disclosure, processing elements 40 may be configured to execute instructions of different wavefronts. In some examples, there may not be sufficient memory locations (e.g., GPRs) in GPRF 32 for the processing elements 40 to execute all of the wavefronts. For instance, some of the GPRs of GPRF 32 may already store data, and there may not be sufficient other GPRs (or GPRs having contiguous addresses) for data for a particular wavefront to be stored. To free memory, control unit 36 may spill data from memory locations of GPRF 32 to another memory unit. However, rather than spilling data from all of the memory locations, control unit 36 may be configured to spill data only from dynamic memory locations. This way, control unit 36 may limit the amount of data that is spilled, which may reduce the latency in the execution of another wavefront or reduce the latency in the completion of execution of one or more threads of a wavefront.

For example, control unit 36 may support prioritized execution of multiple kernels without full context switch. In some techniques, all of the memory locations assigned to a set of instructions is spilled to make memory space for the execution of another set of instructions (e.g., full context switch). However, full context switch may require additional power consumption and additional delay.

With the techniques described in this disclosure, control unit 36 may spill only a portion of memory locations allocated to a set of instructions. For instance, control unit 36 may copy data stored in one or more of the dynamic memory locations in the one or more GPRs of GPRF 32 that are allocated to a first set of instructions to another memory unit and avoid copying of the data in any of the static memory locations in the one or more GPRs of GPRF 32 that are allocated to the first set of instructions to any other memory unit. Control unit 36, scheduler 33, and/or compiler 24 may then together allocate the one or more dynamic memory locations in the one or more GPRs of GPRF 32 that were allocated to the first set of instructions to a second set of instructions. Processing elements 40 may then execute the second set of instructions utilizing the one or more dynamic memory locations in the one or more GPRs of GPRF 32 allocated to the second set of instructions.

It should be understood that in some examples, prior to execution of either the first set of instructions or the second set of instructions, compiler 24 may have allocated some static memory locations to the first set of instructions and some static memory locations to the second set of instructions. Further, compiler 24 may have allocated some dynamic memory locations to the first set of instructions and some dynamic memory locations to the second set of instructions. However, during execution, control unit 36, scheduler 33, and/or compiler 24 may determine that some of the dynamic memory locations allocated to the first set of instructions should be allocated to the second set of instructions. In this case, because of the dynamic nature of these memory locations, even if the first set of instructions have not fully completed execution (i.e., still within the lifetime of the instructions), the dynamic memory locations can be allocated to the second set of instructions.

Also, the allocation of dynamic memory locations may be performed for context switching (e.g., switching from one kernel to another) or for fair scheduling (e.g., allowing delayed threads to catch up). Accordingly, the first set of instructions and the second set of instructions may be for different programs for context switching, or may be for the same program, for fair scheduling. Therefore, the second set of instructions having a higher priority than the first set of instructions refers to both the case where the first and second set of instructions are for different programs and where the first and second set of instructions are for the same programs.

For fair scheduling, scheduler 33 or control unit 36 may need to support fair allocation of processing elements 40 among the wavefronts to guarantee independent forward progress of the threads. In some techniques, control unit 36 may implement time slicing where each wavefront executes up to N instructions, and then giving the next wavefront an opportunity to run. For the next wavefront to execute, the current wavefront may have large portion of the dynamic memory locations reserved for itself. Accordingly, additional spilling may be performed by control unit 36 for one wavefront to have another wavefront succeed and reserve dynamic memory locations for this other wavefront. Compiler 24 may determine how many wavefronts can be executed efficiently for a given kernel based on dynamic memory location footprint at synchronization points (e.g., block points) to minimize spilling.

Figure 4A:
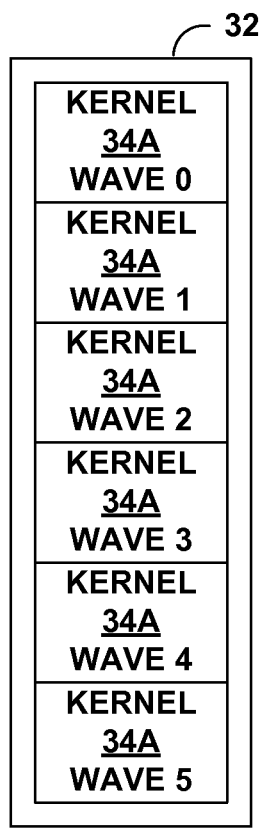
FIGS. 4A-4C are conceptual diagrams illustrating an example of storing data in one or more GPRs.
Figure 4B:
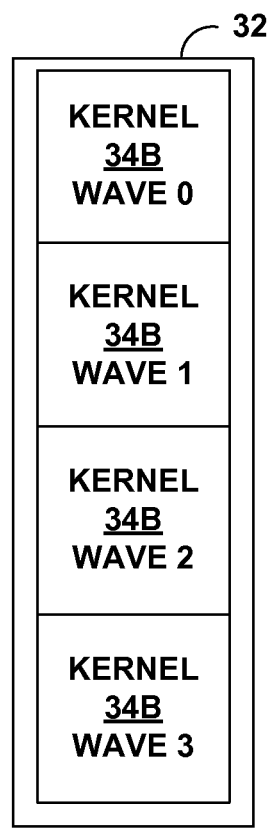
Figure 4C:
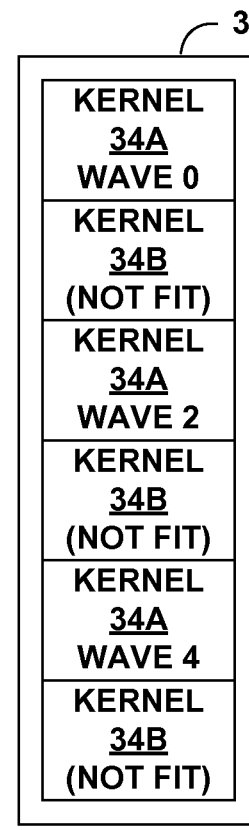

FIGS. 4A-4C are conceptual diagrams illustrating examples of storing data in one or more GPRs. FIG. 4A illustrates an example in which kernel 34A includes six wavefronts (wave 0 to wave 5), and FIG. 4B illustrates an example in which kernel 34B includes four wavefronts (wave 0 to wave 3). In this example, data of the wavefronts for waves 0 to wave 5 of kernel 34A and data of the wavefronts for waves 0 to wave 3 of kernel 34B is illustrated as conceptually being stored in one or more GPRs of GPRF 32. As illustrated, all of the data for each of the wavefronts for kernel 34A can store in GPRs of GPRF 32 and the same is true for each of the wavefronts for kernel 34B.

However, if kernel 34A and 34B are to execute concurrently, there may be issues if only static allocation is used. For example, as illustrated in FIG. 4C, wavefronts 1, 3, and 5 of kernel 34A have finished executing; however, kernel 34B cannot begin executing because there is not a contiguous set of memory locations available for the execution of the wavefronts of kernel 34B (e.g., due to fragmentation). This results in ramp-down/ramp-up penalty because kernel 34B cannot execute until kernel 34A has completed execution, unless all of the memory locations allocated to kernel 34A are spilled (again, assuming only a static allocation, and no dynamic allocation).

Figure 5:
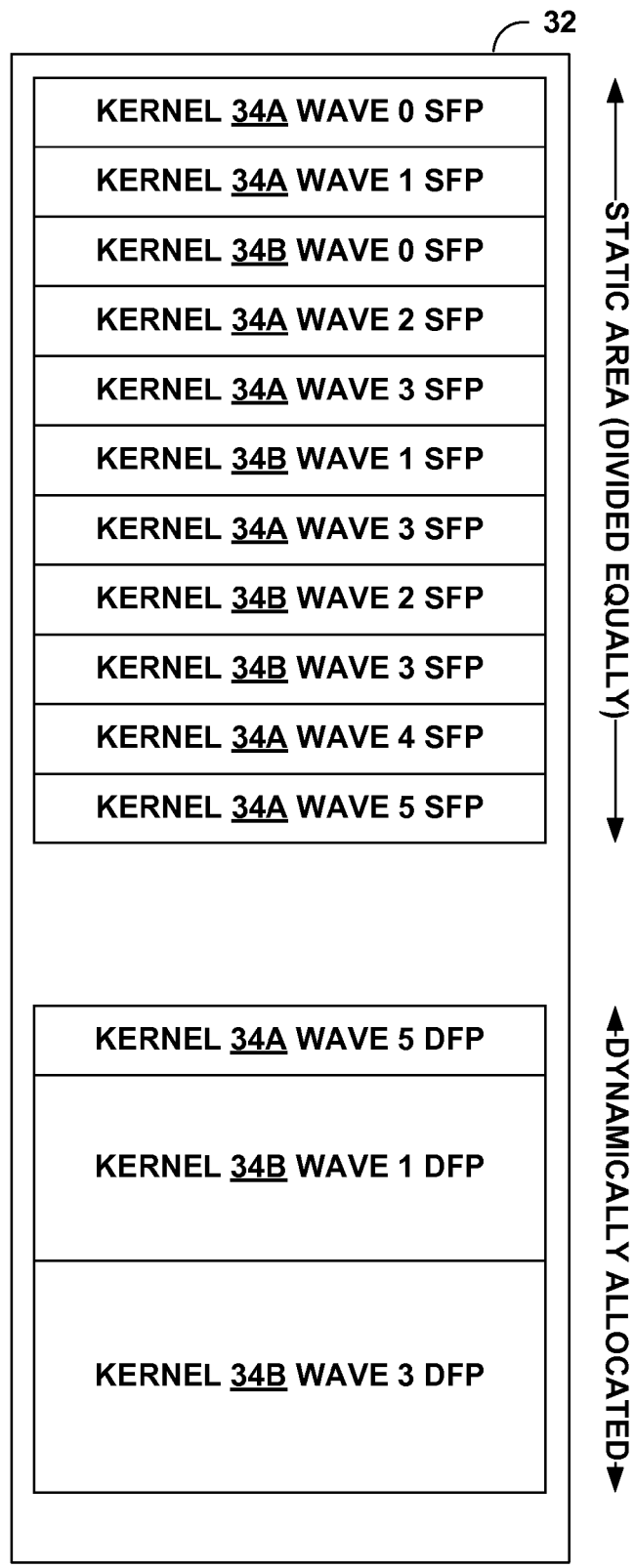
FIG. 5 is a conceptual diagram illustrating an example of storing data in one or more GPRs.

FIG. 5 is a conceptual diagram illustrating an example of storing data in one or more GPRs. In the example illustrated in FIG. 5, one or more GPRs of GPRF 32 includes two portions: static area (portion) and dynamically allocated portion. The static portion includes a pool of static memory location and the dynamic portion includes a pool of dynamic memory locations. In the static portion, each wavefront of kernel 34A and 34B is allocated the same amount of memory locations (e.g., divided equally). For instance, the static footprint (SFP) for wavefronts 0-5 of kernel 34A and wavefronts 0-3 of kernel 34B is the same. However, in the techniques described in this disclosure, whatever additional memory locations the wavefronts might need is available in the dynamic memory locations. For instance, wavefront 5 of kernel 34A includes a dynamic footprint (DFP), and wavefronts 1 and 3 of kernel 34B include a DFP.

In this way, a first set of instructions are allocated a set of static memory locations from a pool of static memory locations and a set of dynamic memory locations from a pool of dynamic memory locations. As an example, wavefront 5 of kernel 34A and wavefronts 1 and 3 of kernel 34B are allocated static memory locations and dynamic memory locations. With the assignment of both static and dynamic memory locations, GPU 14 can switch between kernels 34A and 34B without ramp-down/ramp-up penalty and can even run concurrently. For instance, if one of the wavefronts need additional memory locations, control unit 36, scheduler 33, and/or compiler 24 may allocate dynamic memory locations. For instance, wavefront 5 of kernel 34A may be allocated a dynamic memory location that is then allocated to another wavefront even if kernel 34A has not completed execution (e.g., has not reached the end of its lifetime).

Figure 6:
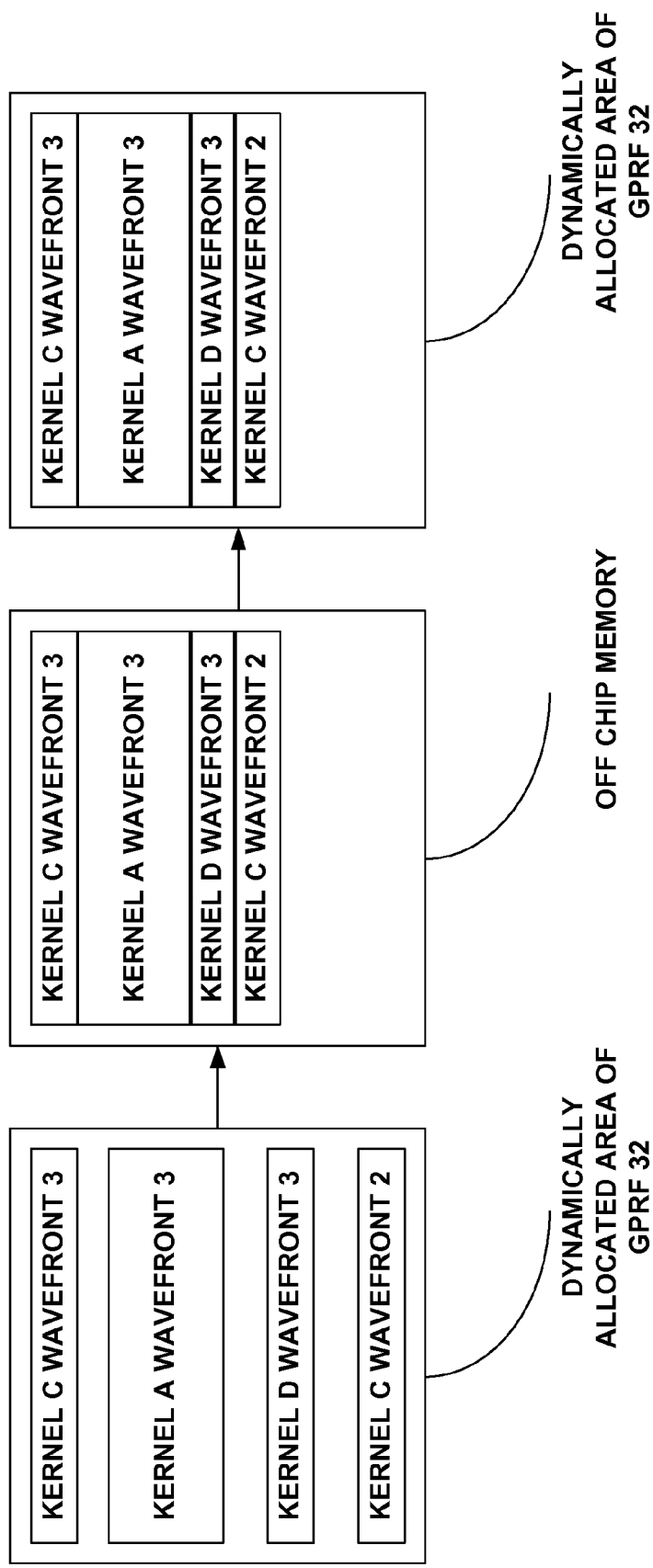
FIG. 6 is a conceptual diagram illustrating an example of defragmentation.

FIG. 6 is a conceptual diagram illustrating an example of defragmentation. The above examples describe context switching and fair scheduling; however, the techniques are not so limited. The techniques may also be used to improve dynamic area management and defragmentation. For instance, techniques other than bump allocation may be used for dynamic area management. But, in any such techniques, memory locations that store data (e.g., active memory locations or registers) of one or more GPRs of GPRF 32 may become fragmented. For example, the memory locations may be allocated contiguously, and if one of wavefronts finishes earlier than other wavefronts, a gap in the memory locations in GPRF 32 may exist. When the memory locations are no longer contiguous, one or more GPRs of GPRF 32 may be considered as being fragmented.

Because contiguous memory locations are allocated, in a course of execution of multiple kernels, the dynamic portions may become fragments and unusable. Scheduler 33 or control unit 36 may detect that the dynamic portion has become fragmented and defragment the one or more GPRs of GPRF 32.

For example, scheduler 33 or control unit 36 may cause processing elements 40 to stop processing of all wavefronts, copy data of all active memory locations within allocated area to a reserve memory region (i.e., another memory unit), copy back the data into the dynamic portion (e.g., dynamic memory locations) compactly so that the data is stored contiguously, update pointers in the dynamic portion for all affected wavefronts, and resume processing of all wavefronts. In this way, scheduler 33 may determine fragmentation of a pool of dynamic memory locations in the dynamic portion, and compact data stored in the dynamic memory locations in response to determining the fragmentation.

For instance, in FIG. 6, only the dynamic portion of GPRF 32 is illustrated and in need of defragmentation. For instance, the data for wavefront 3 of kernel C, wavefront 3 of kernel A, wavefront 3 of kernel D, and wavefront 2 of kernel C are no longer stored contiguously in the dynamic portion. Scheduler 33 may detect such fragmentation and perform the defragmentation process. For instance, in FIG. 6, GPU 14 (e.g., control unit 36 and scheduler 33) may store the data of the wavefronts to an off-chip scratchpad such as DRAM, and in contiguous memory locations in the DRAM. Then, scheduler 33 may cause control unit 36 to store the data of the wavefronts in one or more GPRs of GPRF 32 contiguously (i.e., compactly). For example, after defragmentation, the data for wavefront 3 of kernel C, wavefront 3 of kernel A, wavefront 3 of kernel D, and wavefront 2 of kernel C are stored contiguously in the dynamic portion of GPRF 32.

Figure 7:
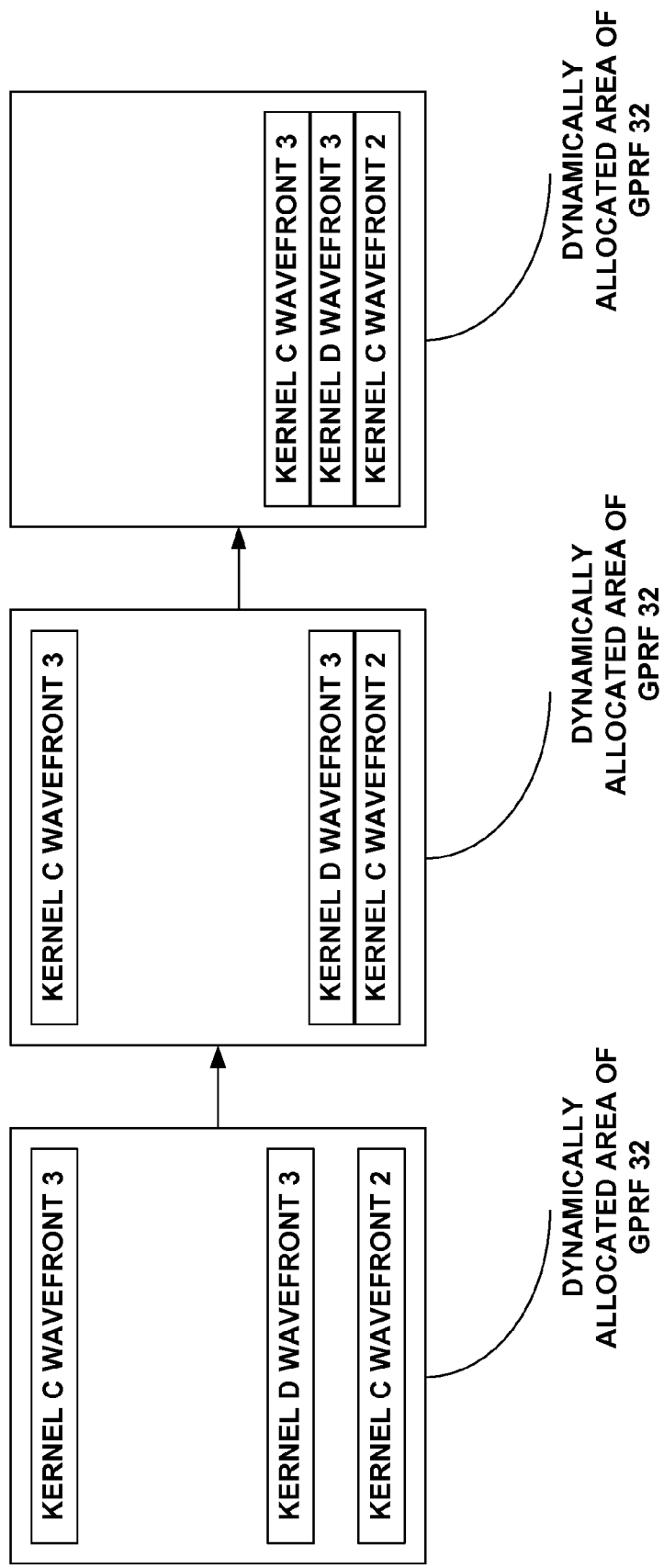
FIG. 7 is a conceptual diagram illustrating another example of defragmentation.

FIG. 7 is a conceptual diagram illustrating another example of defragmentation. In the example illustrated in FIG. 7, GPRF 32 may become defragmented for reasons similar to those as described above with respect to FIG. 6. However, unlike the example illustrated in FIG. 6, rather than writing data stored in the dynamic portion of GPRF 32, control unit 36 may store data of the wavefronts within GPRs of the GPRF 32 to compact the storage.

For instance, in FIG. 7, the dynamically allocated area of GPRF 32 includes the data for wavefront 3 of kernel C, wavefront 3 of kernel D, and wavefront 2 of kernel C, and this data is not stored contiguously. In this example, scheduler 33 may cause control unit 36 to store the data for wavefront 3 of kernel D in the GPR that is contiguously located with the GPR that stores the data for wavefront 2 of kernel C. Then, scheduler 33 may cause control unit 36 to store the data for wavefront 3 of kernel C in the GPR that is contiguously located with the GPR that now stores the data for wavefront 3 of kernel D. In this way, after defragmentation, the data for wavefront 3 of kernel C, wavefront 3 of kernel D, and wavefront 2 of kernel C are stored contiguously in the dynamic portion of GPRF 32.

In the example illustrated in FIG. 7, for defragmentation, a round trip to system memory 16 (off-chip memory) is not needed, and control unit 36 can store data from GPRs of GPRF 32 that are not contiguous into un-occupied gaps of GPRs of GPRF 32 so that the data is stored compactly (e.g., contiguously). By avoiding accessing off-chip memory, the defragmentation example illustrated in FIG. 7 may reduce power consumption as compared to the example in FIG. 6. For instance, accessing off-chip memory generally requires power in the order of a magnitude or two higher than copying data internally to GPU 14. Also, accessing off-chip memory requires scheduling and addressing bus bandwidth limitations. With defragmentation, where access to off-chip memory is not needed, such scheduling and bandwidth limitations may not be present, which further promotes defragmentation performance.

Figure 8:
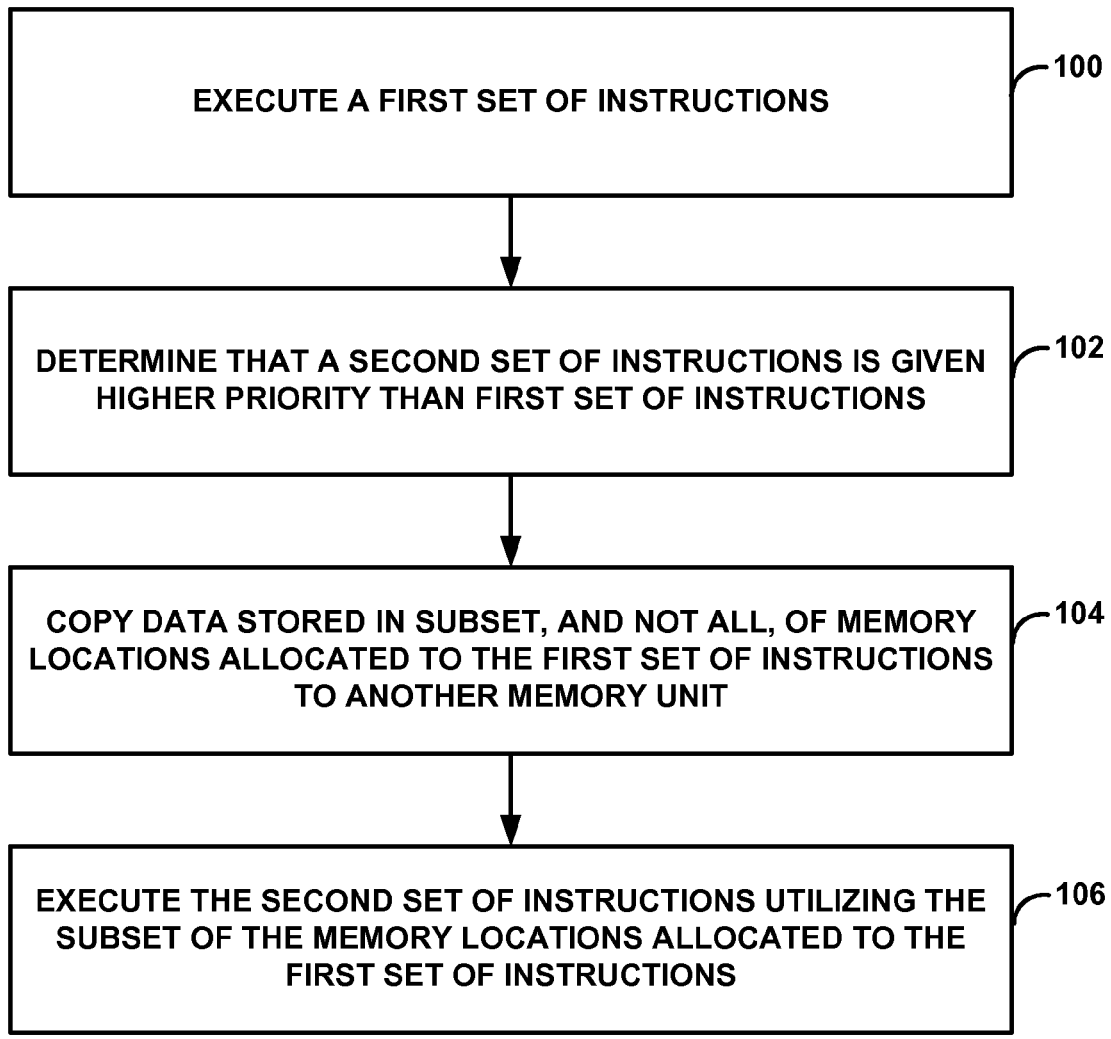
FIG. 8 is a flowchart illustrating an example technique in accordance with this disclosure.

FIG. 8 is a flowchart illustrating an example technique in accordance with this disclosure. In FIG. 8, one or more processing elements 40 of one or more cores 28 of GPU 14 execute a first set of instructions (100).

Control unit 36 or scheduler 33 of GPU 14 may determine that a second set of instructions to be executed on GPU 14 is given higher priority than the first set of instructions executing on GPU 14 (102). For example, for context switching, the first set of instructions and the second set of instructions are for different programs, and scheduler 33 may receive a command from processor 12 instructing GPU 14 to execute the second set of instructions in place of the first set of instructions.

As another example, for fair scheduling, the first and second set of instructions may be instructions for the same program, and possibly for the same wavefront. In such examples, control unit 36 or scheduler 33 may determine that a plurality of instructions of the first set of instructions have completed execution to a block point (e.g., synchronization point) and have not completed the entirety of the execution, and that a plurality of instructions of the second set of instructions should be executed before remaining instructions of the first set of instructions are executed in response to determining that the plurality of instructions of the first set of instructions have complete execution to block point.

Control unit 36 may copy data stored in a subset, and not all, of memory locations of one or more GPRs that are allocated to the first set of instructions to another memory unit in response to determining that the second set of instructions are given higher priority (104). The one or more GPRs include one or more memory locations that are accessible only by the one or more cores 28 of GPU 14 on which the first and second sets of instructions execute.

For example, control unit 36 may receive information allocating a set of static memory locations from a pool of static memory locations in the one or more GPRs (e.g., static GPRs of GPRF 32) for the first set of instructions prior to determining that the second set of instructions to be executed on GPU 14 are given higher priority. The set of static memory locations include memory locations in the one or more GPRs that are only allocated to the first set of instructions throughout the execution of the first set of instructions (e.g., throughout the lifetime of the first set of instructions). Control unit 36 may determine a set of dynamic memory locations from a pool of dynamic memory locations in the one or more GPRs (e.g., dynamic GPRs of GPRF 32) for the first set of instructions prior to determining that the second set of instructions to be executed on GPU 14 are given higher priority. At least one of the dynamic memory locations in the set of dynamic memory locations includes a memory location that is allocated to the first set of instructions and then allocated to one or more other sets of instructions during the execution of the first set of instructions.

In such examples, to copy data stored in the subset, and not all, of the memory locations of the one or more GPRs, control unit 36 is configured to copy data stored in one or more of the dynamic memory locations in the one or more GPRs (e.g., dynamic GPRs of GPRF 32) that are allocated to the first set of instructions to the other memory unit. Control unit 36 may also avoid copying of data stored in any of the static memory locations in the one or more GPRs (e.g., static GPRs of GPRF 32) that are allocated to the first set of instructions to any other memory unit.

One or more processing elements 40 may execute, after the copying, the second set of instructions utilizing the subset of memory locations of the one or more GPRs that were allocated to the first set of instructions (106). For example, scheduler 33 may allocate the one or more dynamic memory locations in the one or more GPRs (e.g., the dynamic GPRs of GPRF 32) that were allocated to the first set of instructions to the second set of instructions, and processing elements 40 may execute the second set of instructions utilizing the one or more dynamic memory locations in the one or more GPRs allocated to the second set of instructions. Also, to determine the set of dynamic memory locations, scheduler 33 or control unit 36 may receive a request from compiler 24 for memory locations in the one or more GPRs during execution of the first set of instructions. In response to receiving the request, scheduler 33 or control unit 36 may determine the set of dynamic memory locations.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of executing instructions on a graphics processing unit (GPU), the method comprising:
    executing, with one or more processing elements of one or more cores of the GPU, a first set of instructions;
    receiving information allocating a set of static memory locations in one or more general purpose registers (GPRs) for the first set of instructions prior to determining that a second set of instructions to be executed on the GPU are given higher priority, wherein the set of static memory locations comprises memory locations in the one or more GPRs that are only allocated to the first set of instructions throughout the execution of the first set of instructions;
    determining a set of dynamic memory locations in the one or more GPRs for the first set of instructions prior to determining that the second set of instructions to be executed on the GPU are given higher priority, wherein at least one of the dynamic memory locations in the set of dynamic memory locations comprises a memory location that is allocated to the first set of instructions and then allocated to one or more other sets of instructions during the execution of the first set of instructions;
    determining, with the GPU, that the second set of instructions to be executed on the GPU is given higher priority than the first set of instructions executing on the GPU;
    copying, with the GPU, data stored in a subset, and not all, of the one or more GPRs that are allocated to the first set of instructions to another memory unit in response to determining that the second set of instructions are given higher priority, the one or more GPRs are accessible by the one or more cores of the GPU on which the first and second sets of instructions execute, wherein copying data stored in the subset, and not all, of the one or more GPRs comprises:
        copying data stored in one or more of the dynamic memory locations in the one or more GPRs that are allocated to the first set of instructions to the other memory unit; and
        avoiding copying of data stored in any of the static memory locations in the one or more GPRs that are allocated to the first set of instructions to any other memory unit; and
    executing, with the one or more processing elements and after the copying, the second set of instructions utilizing the subset of the one or more GPRs.

2. The method of claim 1, further comprising:
    allocating the one or more dynamic memory locations in the one or more GPRs that were allocated to the first set of instructions to the second set of instructions,
    wherein executing the second set of instructions comprises executing the second set of instructions utilizing the one or more dynamic memory locations in the one or more GPRs allocated to the second set of instructions.

3. The method of claim 1, wherein determining the set of dynamic memory locations comprises determining the set of dynamic memory locations in response to receiving a request for memory locations in the one or more GPRs during execution of the first set of instructions.

4. The method of claim 1, wherein the first set of instructions and the second set of instructions are for different programs, and wherein determining that the second set of instructions are given higher priority comprises determining that the second set of instructions are given higher priority in response to receiving a command instructing the GPU to execute the second set of instructions in place of the first set of instructions.

5. The method of claim 1, wherein the first set of instructions and the second set of instructions are for the same program, and wherein determining that the second set of instructions are given higher priority comprises:
   determining that a plurality of instructions of the first set of instructions have completed execution to a block point; and
   determining that a plurality of instructions of the second set of instructions should be executed before remaining instructions of the first set of instructions are executed in response to determining that the plurality of instructions of the first set of instructions have complete execution to block point.

6. A device for executing instructions, the device comprising:
   one or more general purposes registers (GPRs); and
   a graphics processing unit (GPU) configured to:
      execute, with one or more processing elements of one or more cores of the GPU, a first set of instructions;
      receive information allocating a set of static memory locations in the one or more GPRs for the first set of instructions prior to determining that a second set of instructions to be executed on the GPU are given higher priority, wherein the set of static memory locations comprises memory locations in the one or more GPRs that are only allocated to the first set of instructions throughout the execution of the first set of instructions;
      determine a set of dynamic memory locations in the one or more GPRs for the first set of instructions prior to determining that the second set of instructions to be executed on the GPU are given higher priority, wherein at least one of the dynamic memory locations in the set of dynamic memory locations comprises a memory location that is allocated to the first set of instructions and then allocated to one or more other sets of instructions during the execution of the first set of instructions;
      determine that the second set of instructions to be executed on the GPU is given higher priority than the first set of instructions executing on the GPU;
      copy data stored in a subset, and not all, of the one or more GPRs that are allocated to the first set of instructions to another memory unit in response to determining that the second set of instructions are given higher priority, wherein the one or more GPRs are accessible by the one or more cores of the GPU on which the first and second sets of instructions execute, wherein to copy data stored in the subset, and not all, of the one or more GPRs, the GPU is configured to:
         copy data stored in one or more of the dynamic memory locations in the one or more GPRs that are allocated to the first set of instructions to the other memory unit; and
         avoid copying of data stored in any of the static memory locations in the one or more GPRs that are allocated to the first set of instructions to any other memory unit; and
      execute, with the one or more processing elements and after the copying, the second set of instructions utilizing the subset of the one or more GPRs.

7. The device of claim 6, wherein the GPU comprises the one or more GPRs.

8. The device of claim 6, wherein the GPU is configured to:
   allocate the one or more dynamic memory locations in the one or more GPRs that were allocated to the first set of instructions to the second set of instructions,
   wherein to execute the second set of instructions, the GPU is configured to execute the second set of instructions utilizing the one or more dynamic memory locations in the one or more GPRs allocated to the second set of instructions.

9. The device of claim 6, wherein to determine the set of dynamic memory locations, the GPU is configured to determine the set of dynamic memory locations in response to receiving a request for memory locations in the one or more GPRs during execution of the first set of instructions.

10. The device of claim 6, wherein the first set of instructions and the second set of instructions are for different programs, and wherein to determine that the second set of instructions are given higher priority, the GPU is configured to determine that the second set of instructions are given higher priority in response to receiving a command instructing the GPU to execute the second set of instructions in place of the first set of instructions.

11. The device of claim 6, wherein the first set of instructions and the second set of instructions are for the same program, and wherein to determine that the second set of instructions are given higher priority, the GPU is configured to:
    determine that a plurality of instructions of the first set of instructions have completed execution to a block point; and
    determine that a plurality of instructions of the second set of instructions should be executed before remaining instructions of the first set of instructions are executed in response to determining that the plurality of instructions of the first set of instructions have complete execution to block point.

12. A device for executing instructions, the device comprising:
    one or more general purposes registers (GPRs); and
    a graphics processing unit (GPU) comprising:
       means for executing a first set of instructions, wherein the GPU comprises one or more cores, and the one or more cores comprise the means for executing;
       means for receiving information allocating a set of static memory locations in the one or more GPRs for the first set of instructions prior to determining that a second set of instructions to be executed on the GPU are given higher priority, wherein the set of static memory locations comprises memory locations in the one or more GPRs that are only allocated to the first set of instructions throughout the execution of the first set of instructions;
       means for determining a set of dynamic memory locations in the one or more GPRs for the first set of instructions prior to determining that the second set of instructions to be executed on the GPU are given higher priority, wherein at least one of the dynamic memory locations in the set of dynamic memory locations comprises a memory location that is allocated to the first set of instructions and then allocated to one or more other sets of instructions during the execution of the first set of instructions;

means for determining that the second set of instructions to be executed on the GPU is given higher priority than the first set of instructions executing on the GPU;

means for copying data stored in a subset, and not all, of the one or more GPRs that are allocated to the first set of instructions to another memory unit in response to determining that the second set of instructions are given higher priority, wherein the one or more GPRs are accessible by the one or more cores of the GPU on which the first and second sets of instructions execute, wherein the means for copying data stored in the subset, and not all, of the one or more GPRs comprises means for copying data stored in one or more of the dynamic memory locations in the one or more GPRs that are allocated to the first set of instructions to the other memory unit, and avoiding copying of data stored in any of the static memory locations in the one or more GPRs that are allocated to the first set of instructions to any other memory unit; and means for executing, after the copying, the second set of instructions utilizing the subset of the one or more GPRs.

13. The device of claim 12, further comprising:
means for allocating the one or more dynamic memory locations in the one or more GPRs that were allocated to the first set of instructions to the second set of instructions,
wherein the means for executing the second set of instructions comprises means for executing the second set of instructions utilizing the one or more dynamic memory locations in the one or more GPRs allocated to the second set of instructions.

14. The device of claim 12, wherein the means for determining the set of dynamic memory locations comprises means for determining the set of dynamic memory locations in response to receiving a request for memory locations in the one or more GPRs during execution of the first set of instructions.

15. A computer-readable storage medium having instructions stored thereon that when executed cause one or more processors to:
execute, with one or more processing elements of one or more cores of a graphics processing unit (GPU), a first set of instructions;
receive information allocating a set of static memory locations in one or more general purpose registers (GPRs) for the first set of instructions prior to determining that a second set of instructions to be executed on the GPU are given higher priority, wherein the set of static memory locations comprises memory locations in the one or more GPRs that are only allocated to the first set of instructions throughout the execution of the first set of instructions; and
determine a set of dynamic memory locations in the one or more GPRs for the first set of instructions prior to determining that the second set of instructions to be executed on the GPU are given higher priority, wherein at least one of the dynamic memory locations in the set of dynamic memory locations comprises a memory location that is allocated to the first set of instructions and then allocated to one or more other sets of instructions during the execution of the first set of instructions;

determine that the second set of instructions to be executed on the GPU is given higher priority than the first set of instructions executing on the GPU;

copy data stored in a subset, and not all, of the one or more GPRs that are allocated to the first set of instructions to another memory unit in response to determining that the second set of instructions are given higher priority, wherein the one or more GPRs are accessible by the one or more cores of the GPU on which the first and second sets of instructions execute, wherein the instructions that cause the one or more processors to copy data stored in the subset, and not all, of the one or more GPRs comprise instructions that cause the one or more processors to:
copy data stored in one or more of the dynamic memory locations in the one or more GPRs that are allocated to the first set of instructions to the other memory unit; and
avoid copying of data stored in any of the static memory locations in the one or more GPRs that are allocated to the first set of instructions to any other memory unit; and execute, with the one or more processing elements and after the copying, the second set of instructions utilizing the subset of the one or more GPRs.

16. The computer-readable storage medium of claim 15, further comprising instructions that cause one or more processors to:
allocate the one or more dynamic memory locations in the one or more GPRs that were allocated to the first set of instructions to the second set of instructions,
wherein the instructions that cause the one or more processors to execute the second set of instructions comprise instructions that cause the one or more processors to execute the second set of instructions utilizing the one or more dynamic memory locations in the one or more GPRs allocated to the second set of instructions.

17. The computer-readable storage medium of claim 15, wherein the instructions that cause the one or more processors to determine the set of dynamic memory locations comprise instructions that cause the one or more processors to determine the set of dynamic memory locations in response to receiving a request for memory locations in the one or more GPRs during execution of the first set of instructions.

18. A computer-readable storage medium of claim 15, wherein the first set of instructions and the second set of instructions are for different programs, and wherein the instructions that cause the one or more processors to determine that the second set of instructions are given higher priority comprise instructions that cause the one or more processors to determine that the second set of instructions are given higher priority in response to receiving a command instructing the GPU to execute the second set of instructions in place of the first set of instructions.

19. A computer-readable storage medium of claim 15, wherein the first set of instructions and the second set of instructions are for the same program, and wherein the instructions that cause the one or more processors to determine that the second set of instructions are given higher priority comprise instructions that cause the one or more processors to:

determine that a plurality of instructions of the first set of instructions have completed execution to a block point; and determine that a plurality of instructions of the second set of instructions should be executed before remaining instructions of the first set of instructions are executed in response to determining that the plurality of instructions of the first set of instructions have complete execution to block point.

\* \* \* \* \*